(12) United States Patent
Clarke et al.

(10) Patent No.: US 11,346,593 B2
(45) Date of Patent: May 31, 2022

(54) REFRIGERATOR FAN DEVICE AND ULTRA-LOW TEMPERATURE FREEZER

(71) Applicant: Eppendorf AG, Hamburg (DE)

(72) Inventors: Simon Clarke, Essex (GB); George Mason, Suffolk (GB); Rüdiger Uhlendorf, Dransfeld (DE)

(73) Assignee: EPPENDORF AG, Hamburg (DE)

( * ) Notice: Subject to any disclaimer, the term of this patent is extended or adjusted under 35 U.S.C. 154(b) by 171 days.

(21) Appl. No.: 16/524,014

(22) PCT Filed: Dec. 19, 2017

(86) PCT No.: PCT/EP2017/083604
§ 371 (c)(1),
(2) Date: Jul. 29, 2019

(87) PCT Pub. No.: WO2018/137858
PCT Pub. Date: Aug. 2, 2018

(65) Prior Publication Data
US 2020/0158415 A1    May 21, 2020

(30) Foreign Application Priority Data

Jan. 27, 2017   (EP) .................................. 17153488

(51) Int. Cl.
*F25D 11/02*     (2006.01)
*F25D 17/06*     (2006.01)
(Continued)

(52) U.S. Cl.
CPC ............ *F25D 17/067* (2013.01); *F25D 11/02* (2013.01); *F25D 17/08* (2013.01); *H02P 29/60* (2016.02);
(Continued)

(58) Field of Classification Search
CPC .... F25B 2600/112; F25D 11/02; F25D 17/06; F25D 17/067; F25D 17/08;
(Continued)

(56) References Cited

U.S. PATENT DOCUMENTS 3,759,051 A    9/1973   Ohnishi
4,736,594 A *  4/1988   Pao ....................... F25B 47/022
                                                            62/155
(Continued)

FOREIGN PATENT DOCUMENTS

CN              1465945 A    1/2004
CN            201499074 U    6/2010
(Continued)

OTHER PUBLICATIONS

International search report for patent application No. PCT/EP2017/083604 dated Apr. 13, 2018.

*Primary Examiner* — Filip Zec
(74) *Attorney, Agent, or Firm* — Bachman and Lapointe PC; George Coury

(57) ABSTRACT

A refrigerator fan device, comprising: a fan motor (10) which has a fan rotor (12) and which can be provided in an air duct between an air inlet (16), a refrigerator heat exchanger (15), and/or a refrigerator compressor (14) and an air outlet (18) on or in a refrigerator housing (20, 22), said fan motor (10) being connectable to a unit of the refrigerator, via electrical supply and/or control lines, wherein the fan motor (10) is realized as a brushless speed-controllable DC motor whose operating speed is or can be controlled as a function of an operating and/or used cooling space temperature signal of, the assigned or assignable refrigerator compressor.

14 Claims, 1 Drawing Sheet

(51) Int. Cl.
*H02P 29/60* (2016.01)
*F25D 17/08* (2006.01)

(52) U.S. Cl.
CPC . *F25B 2600/112* (2013.01); *F25D 2317/0666* (2013.01); *F25D 2600/02* (2013.01); *F25D 2600/06* (2013.01); *F25D 2700/122* (2013.01)

(58) Field of Classification Search
CPC ......... F25D 2317/0666; F25D 2600/02; F25D 2600/06; F25D 2700/122; H02P 29/60; Y02B 30/70
See application file for complete search history.

(56) References Cited

U.S. PATENT DOCUMENTS

| | | | | |
|---|---|---|---|---|
| 5,488,835 | A * | 2/1996 | Howenstine | F25D 17/067 62/186 |
| 6,271,638 | B1 * | 8/2001 | Erdman | F25D 29/00 318/400.01 |
| 6,725,680 | B1 * | 4/2004 | Schenk | F25D 29/00 62/186 |
| 6,769,265 | B1 * | 8/2004 | Davis | F25D 17/065 62/187 |
| 6,865,899 | B2 * | 3/2005 | Nam | F25D 17/045 62/187 |
| 6,940,235 | B2 * | 9/2005 | Getz | H02P 6/08 318/400.15 |
| 7,151,349 | B1 * | 12/2006 | Williamson | F04D 27/004 318/599 |
| 7,490,480 | B2 * | 2/2009 | Davis | F25D 29/00 62/180 |
| 9,140,477 | B2 * | 9/2015 | Gomes | F25D 29/00 |
| 10,041,749 | B2 * | 8/2018 | Rollins | H02P 29/60 |
| 2009/0133419 | A1 * | 5/2009 | Matsuno | F25B 49/025 62/239 |

FOREIGN PATENT DOCUMENTS

| | | |
|---|---|---|
| CN | 103104959 A | 5/2013 |
| JP | 5971970 A | 4/1984 |
| JP | 4013076 A | 1/1992 |
| JP | 2000258026 A | 9/2000 |
| JP | 2001336869 A | 12/2001 |
| JP | 2001339984 A | 12/2001 |

* cited by examiner

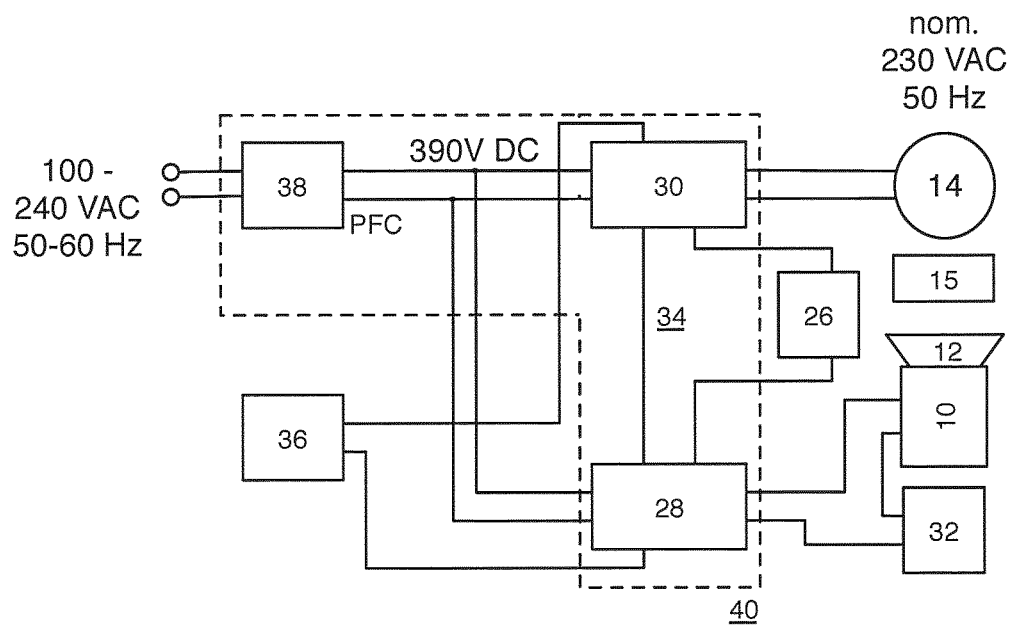
Fig. 1
Fig. 2
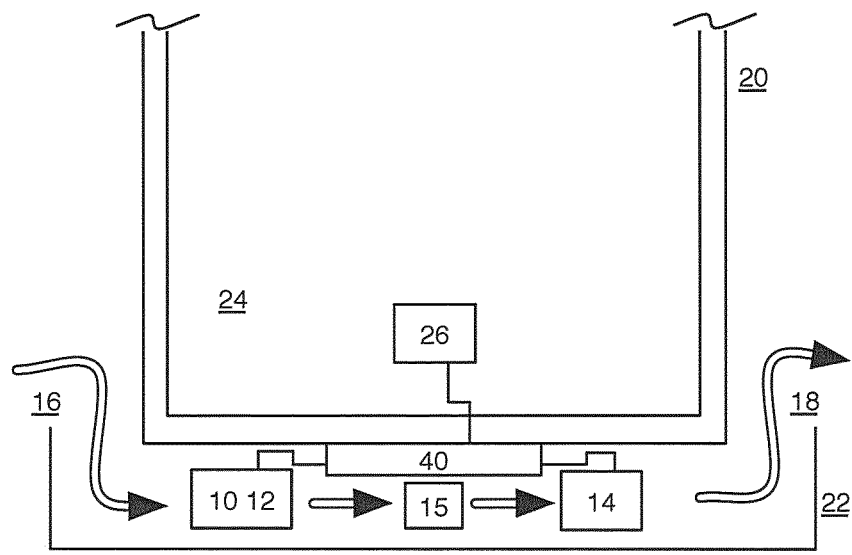

REFRIGERATOR FAN DEVICE AND ULTRA-LOW TEMPERATURE FREEZER

BACKGROUND OF THE INVENTION

The present invention relates to a refrigerator fan device. Furthermore, the present invention relates to an ultra-low temperature refrigerator having such a fan device.

It is generally known from the state of the art for refrigerators, in particular ultra-low temperature (ULT) refrigerators, i.e. refrigerators for a used cooling space at a cooling temperature below −40° C., typically even below −60° C. to as far as −80° C. and below, to be provided with fan devices for heat removal of the process heat produced at the heat exchanger (condenser) in the thermodynamic process and, if required, for cooling the refrigerator compressors employed. These fan devices, which typically have at least one fan motor driving a fan rotor, are suitably provided in an air duct, typically on or in the area of a bottom of a refrigerator housing, and guide air entering through an air inlet across the condenser and the compressors and to an air outlet, thus ensuring operating conditions of the units that are favorable and necessary for the cooling mode.

Refrigerators of this kind, which are considered generic and generally known, are commonly used for industrial and research purposes, a typical use of these devices being long-term refrigeration: biological or medical samples or content of this kind suitably provided as cooled goods are typically stored at these (ultra-low temperature) target temperatures for several weeks or even months with the aim of complying with legal requirements, for example.

Aside from electrical energy consumption and the compressors as well as the fan motors used for cooling and to remove heat from the heat exchanger, noise emitted by these fan motors especially during continuous operation plays an increasingly important role. Depending on a position of a refrigerator system typically provided with the generic fan device, fan noise of a fan device of this kind is often perceived as disturbing, especially when the refrigerator compressor (commonly also a plurality of compressors disposed in the form of a so-called cascade) is running at reduced cooling output or reduced compressor motor speed (a compressor of this kind often being additionally sound-insulated) in a stationary (continuous) cooling mode at or close to a target temperature. In this case, not only the fan motor itself (which is typically operated at a fixed speed and designed as an AC motor) causes potentially disturbing noise, but also the blades of the fan rotor, which generate air flow and are typically operated at speeds of about 1300 to 1400 $min^{-1}$, cause disturbing noise (so-called fan tip noise, i.e. swooshing caused by fan blades). Since generic fan motors themselves are usually operated without speed control or RPM control (not least because the generically used motors do not easily allow for speed control for cost reasons, for example) and operation of a fan motor typically involves controlling an assigned compressor (i.e. the fan motor is operated constantly synchronous with the refrigerator compressor), fan motor operation and the accompanying noise emission are continuous during compressor operation at a basically unchanged high noise level.

Additionally, the electrical energy consumption is connected with the fan motor, which is typically not controlled in a closed loop and thus merely switched on/off digitally; the fan is operated at nominal or target output irrespective of an actual need for heat removal or cooling of the heat exchanger and compressor to be cooled by the generic fan device, wherein, which a view to output peaks of the associated cooling circuit that will have to be cooled, the fan output, and with it the fan motor, is typically even oversized to a certain degree in order to avoid inefficient operation of the cooling circuit in the event of such cooling output peaks. However, this leads to a disadvantage in efficiency in operating situations of reduced cooling output of the refrigerator compressor (i.e. during stationary operation of a target cooling temperature, for example). This is because, even in this case, the cooling circuit will be subjected to the full fan output of the heat exchanger and of the fan device, which, in turn, causes increased compressor output in a way that reduces energy efficiency because (during a cooling output operation reduced in this way) the refrigerator compressor will not (no longer) run at an optimized working temperature or on an optimized working point because of the high air flow still continuing to flow.

SUMMARY OF THE INVENTION

Therefore, the object of the present invention is to improve a refrigerator fan device according to the preamble of the main claim, in particular intended for so-called ultra-low temperature refrigerators, in terms of their noise behavior and in particular to also provide an improved fan device that improves energy efficiency of both the fan motor and the cooling units (heat exchanger, compressor) subject to its air cooling. A constructively simple realization that minimizes the amount of hardware needed is an aspect to be observed in particular, and it should preferably also be ensured that an improved fan device of this kind can be operated easily and reliably in different operating environments, in particular operating environments with different country-specific nominal mains voltages.

The object is attained by the refrigerator fan device having the features disclosed herein and by the ultra-low temperature refrigerator as disclosed herein as a use of a fan device of this kind; advantageous embodiments of the invention are also described herein and in the dependent claims. Additional protection within the scope of the invention is claimed for a method for operating a refrigerator fan device according to the invention, wherein method steps apparent from the present application are to be considered disclosed as part of the invention.

In an advantageous manner according to the invention, first of all, the fan motor is realized as a brushless speed-controlled DC motor. In a particularly advantageous manner according to the invention, this allows the fan motor speed not only to be controlled, according to the invention, as a function of an operating and/or used cooling space temperature but also to be realized in such a manner that the fan motor can be operated in a particularly simple manner by means of motor electronics or ballast electronics that are typically used already to operate the ULT refrigerator itself and which, being typically provided with voltage converter means for processing different input supply network AC voltages in an additionally advantageous manner, can then provide a constant DC voltage at the output of advantageous voltage converter means of this kind, from which an operating voltage for the DC motor according to the invention can be generated or derived and, if required, controlled.

In this way, the present invention advantageously allows the speed of the fan motor (and thus its electrical power consumption) to be adjusted to the actual operating conditions of the (ULT) refrigerator units cooled by it, the operating and/or used cooling space temperature having proven to be a particularly suitable control factor according to the invention in order to (also) influence the speed of the fan motor. Thus, the advantageous consequence is that when the compressor is operated at a target cooling temperature with no or only little temperature fluctuations, thus corresponding to a stationary operation and potentially in connection with reduced compressor output, the fan speed can be lowered as well, which is accompanied by the corresponding positive effects on fan noise and on the electrical power consumption of the DC fan motor according to the invention. In actual operation, the maximum speed of ca. 1300 $min^{-1}$ can be reduced to ca. 300 to 400 $min^{-1}$; with regard to an electrical power consumption of a typical fan motor, this means a reduction of the electrical power consumption from ca. 30 W at full load to ca. 2 to 3 W at partial load in the indicated low speed range. By contrast, the invention ensures that during operating modes of the refrigerator compressor in which the latter is operated at high compressor output, a correspondingly increased fan speed of the fan motor is controlled so that ideal air conveyance conditions exist at any time.

According to the invention, this temperature control according to the invention happens as a function of the operating and/or used cooling space temperature signal, which, according to an embodiment, is generated by temperature sensor means that may be assigned to a used cooling space of the cooled portion of the refrigerator. Alternatively, it is also possible to suitably tap a temperature signal at the (at least one) refrigerator compressor, such as at an associated compressor housing; again additionally or alternatively, such temperature signals can also be obtained indirectly from a motor current or armature current of a refrigerator compressor motor, or other signals corresponding or proportional to an operating and/or used cooling space temperature can be used correspondingly.

The operating and/or used cooling space temperature signal can in particular also contain a temperature gradient, i.e. information as to how or how strongly the temperature of the used cooling space or of the refrigerator compressor has changed in a time interval, so as to allow conclusions to be drawn regarding a cooling mode during cooling down and during a stationary cooling mode.

In connection with an embodiment of the invention, it is particularly preferred for a temperature sensor already assigned to the used cooling space anyway to be used as a temperature sensor means, such as for the purpose of using the temperature signal thus generated to control or feedback-control a cooling mode of the refrigerator compressor (itself). In this way, not only can a sensor signal available anyway and typically processed already by electronics connected upstream of the refrigerator compressor be used, but there is also no need for additional sensors, which might include additional lines, feedthroughs or the like forming heat bridges that should be avoided, in the insulation-sensitive and temperature-sensitive environment of the ultra-low temperature refrigerators.

In connection with integrated motor electronics or ballast electronics for both the (at least one) refrigerator compressor (but preferably multiple refrigerator processors provided as a cascade) and the fan motor, it is additionally advantageous for said electronics to be provided with a power factor correction (PFC) so as to provide universality for various (national) mains voltage environments as well as minimize potential circuit feedback into such a (public) power supply network.

An especially elegant embodiment which is useful for sensitive operating environments consists in the delay means which are provided according to an embodiment and which, again being preferably realized in connection with the integrated electronics, act on the refrigerator compressor and are configured such that in response to an activation or operation start signal activating the refrigerator, the fan motor is activated prior to activation of the refrigerator compressor, more specifically a predetermined time interval prior to activation of the refrigerator compressor as per an embodiment according to the invention. For example, a preferred embodiment of this kind can, with significant effect on operational reliability of a refrigerator device realized in this way, help prevent a problem that the cooling circuit operated by the refrigerator compressor and, at the ultra-low temperatures preferred at hand, often containing flammable refrigerants, has a leak which can pose a danger of explosion in the case of possible sparking caused by the activation of the compressor. In this regard, the solution according to an embodiment of the invention of activating the fan motor a predetermined time prior to switching on the refrigerator compressor has the effect that the cooling air flow removes any leaked refrigerant or at least dilutes it far enough that the remaining mixture is no longer flammable in the case of the leak and the danger of explosion is thus significantly reduced. A typical time interval to be further preferably set for such a delay of the compressor activation relative to activation of the fan motor is ca. 5 s, time intervals configured according to the invention offering reference points for how this delay should be determined depending on the configuration of a correspondingly equipped refrigerator and on operating environments and conditions.

In particular the use as per the invention of a brushless DC motor for realizing the fan motor often offers the option that a speed-proportional signal is available for evaluating or monitoring the operating mode of the fan motor (whether via the control loop driving the DC motor or via a separate return channel of motor control electronics). By evaluating such a (current) speed signal of the fan motor according to the invention, possible malfunctions can be detected and the cooling or compressor operation of a correspondingly equipped refrigerator device can be influenced in response, for example. For instance, in response to activation of a fan motor according to the invention, monitoring of the associated speed signal helps determine whether said motor works at an intended speed (such as by comparing it to electronically stored target values, for example), and if the speed falls short of a speed threshold, a malfunction can be assumed (such as a fan motor defect or a blockage in the air duct), whereupon an error report can be output or starting of the refrigerator compressor may even be disabled. Additionally or alternatively, with a fan motor speed detection or monitoring of this kind, the fan motor speed can be put in relation to the operating and/or used cooling space temperature detected according to the invention, and when a predetermined deviation from intended target values or target value ranges occurs, corresponding error signals can be output or compressor operation can be deactivated so as to avoid potential damage to the refrigerator.

Although protection is sought for the refrigerator fan device on its own within the scope of the present invention, and thus, neither the refrigerator with an associated refrigerator housing, which offers a preferred use environment, nor the (at least one) refrigerator compressor itself have to be the subject-matter of the invention, a use of the refrigerator fan device according to the invention in connection with an ultra-low temperature refrigerator still is a preferred realization of the invention and envisages accordingly that a refrigerator of this kind is configured as a use environment for the fan device according to the invention. It is preferred, on the one hand, to have the fan device act on a (single)

cooling circuit, meaning the air duct according to the invention will have said compressor in the area through which air flows in addition to the fan motor and the fan rotor. On the other hand, it is also conceivable in the case of a cascaded arrangement of a plurality of cooling circuits with respective heat exchangers and refrigerator compressors as typically intended for very low target temperatures, that a corresponding plurality of fan motors or, alternatively, again only one fan motor is used.

Although the present invention envisages ultra-low temperatures as a preferred field of use, the invention is not limited to said context; instead, it is equally advantageous to use the technology according to the invention and its embodiments for refrigerators which cover other temperature ranges, wherein, not least because of the advantages of the invention in terms of energy efficiency, mobile uses or an application in connection with refrigerators provided in vehicles may be suitable.

BRIEF DESCRIPTION OF THE DRAWINGS

Other advantages, features and details of the invention are apparent from the following description of preferred embodiments and from the drawing, in which:

FIG. 1: shows a schematic block diagram of the refrigerator fan device according to the invention in cooperation with a heat exchanger and a refrigerator compressor for realizing a first embodiment of the invention, and FIG. 2: shows a schematic illustration of a refrigerator (configured for ultra-low temperature), which, at the bottom, forms a fan device according to FIG. 1 and an air duct having the refrigerator compressor.

DETAILED DESCRIPTION

As the schematic block diagram of FIG. 1 illustrates logically and functionally and as the geometrical illustration of FIG. 2 shows, a fan motor 10 realized as a brushless DC motor and having a fitted fan rotor 12 is placed relative to a heat exchanger (condenser) 15, which dimensioned for ultra-low temperature cooling purposes and includes a refrigerator compressor 14 of a cooling circuit (not shown), in such a manner that a cooling air flow generated by the fan rotor 12, coming from an inlet 16 (suitably covered by a fan grill, a filter or the like in a manner not shown) and conducted toward an outlet 18 can be applied from an ambient air environment of the refrigerator 20 schematically shown in FIG. 2. More precisely, said outlined air-conduction path 16-10-12-15-14-18 is formed in a bottom area 22 of a refrigerator housing of the refrigerator 20, which offers an interior 24 as a used cooling space for receiving cooled goods which, in the embodiment described, can be maintained in the ultra-low temperature range at target temperatures of −80° C. to −40° C.

A temperature sensor 26 is provided, which serves to detect a current cooling temperature of said used cooling space and, as schematically illustrated, can be evaluated or used for operation control by both a fan motor control unit 28 connected upstream of the fan motor 10 and a compressor control unit 30 connected upstream of the compressor motor 14. More precisely, it is envisaged in the embodiment shown that the temperature signal output by the temperature sensor 26 is used (as an absolute temperature signal, additionally or alternatively also as a temperature gradient signal) by the compressor control unit 30 to control a cooling output of the compressor 14 according to a current temperature in the used cooling space; this can advantageously happen (at preferably constant compressor speeds) in that a compressor operating voltage of the compressor motor nominally operated with 230 VAC is lowered, such as when a stationary operating mode at a target cooling temperature has been reached. FIG. 2 shows that the units 28 and 30 (FIG. 1) can also be suitably combined in the form of an electronic module 40 provided in the bottom area 22.

In connection with the embodiment described, the temperature signal of the sensor 26 is additionally used by the fan motor control unit 28 in order to control the operation of the fan motor 10, in particular its speed, as a function of the temperature (or alternatively or additionally as a function of the temperature gradient) according to current temperature conditions. For instance, according to the invention, operation of the compressor 14 (reduced in electrical power consumption) advantageously requires only reduced fan output in combination with a reduction of the fan speed. Accordingly, the fan motor control sets the speed to the lowest value, which means that owing to the thus reduced air flow of the rotor 12, the compressor 14 and the heat exchanger (condenser) 15 continue to be kept at an ideal working point (working temperature). A speed detector 32 which is connected upstream of the fan motor 10 and whose detector signal can be evaluated by the fan motor control 28 then allows a speed control loop for the fan motor to be realized with a target signal provided by the sensor 26 (alternatively also outputtable in a temperature-controlled manner directly by the compressor control 30).

Additionally, the block diagram of FIG. 1 illustrates that by being compared to stored speed parameters or speed target values suitably assigned to the fan motor control, the output signal of the speed detector 32 can also perform effective error detection of the fan motor or of the air duct. If, for example, a current speed detector signal 32 does not match a (predetermined) control signal or would lead to control interference outside of predetermined limits, a potential malfunction of the fan motor or, alternatively, a blockage of, e.g., the filter associated with the air inlet 16 can be assumed and activation of the compressor motor can be prevented by the control unit 30 via a control line 34.

Additionally or alternatively, the control line 34 can also be used to start operation of the fan motor 10 (through the fan motor control) in response to an activation of the refrigerator before the compressor 14 is activated; in connection with the fan motor control 28, this would mean that a delay unit is implemented which, by means of control line 34, will trigger the delayed compressor activation. This can serve the purpose explained above of removing or diluting vapors by means of the fan air flow so as to prevent dangers from leaked coolant before the compressor is activated.

For outputting potential error or status information, the block diagram of FIG. 1 further shows a corresponding status or signal functionality in the form of unit 36, and a voltage converter unit 38 is formed at the input for adaptation to different (in particular also national) AC voltage mains environments of public mains, said voltage converter unit 38, which is supplemented by a power factor correction (PFC) functionality (not shown), converting the mains AC voltage of a wade input range between ca. 100 and ca. 240 VAC (with typical mains frequencies between 50 and 60 Hz) into a DC voltage of 390 V, which can then also be used to operate the fan motor control according to an embodiment of the invention.

The invention claimed is:

1. A refrigerator fan device, comprising:
   a fan motor (10) which has a fan rotor (12), the fan motor being provided in an air duct along with a refrigerator heat exchanger (15) or a refrigerator compressor (14), the fan motor being positioned in the air duct between an air inlet (16) and an air outlet (18) on a refrigerator (20) or in a bottom area (22) of a refrigerator housing, said fan motor (10) being connected to a unit of the refrigerator via electrical supply or control lines, wherein the fan motor (10) is a brushless speed-controllable DC motor whose operating speed is controlled such that when the refrigerator compressor (14) is in a stationary operation, the operating speed of the fan motor (10) is reduced as compared to a fan speed during cooling down of a used cooling space by the refrigerator compressor (14), wherein the stationary operation is defined as operation when a temperature in the used cooling space is within a range of a target cooling temperature and a time derivative of the temperature is equal to or lower than a predetermined threshold, and wherein the temperature is shown by an operating temperature signal or a used cooling space temperature signal, the operating temperature signal showing the temperature of the refrigerator compressor (14).

2. The device according to claim 1, further comprising temperature sensor means (26) which are assigned to a used cooling space of the refrigerator to generate the operating temperature signal or the used cooling space temperature signal.

3. The device according to claim 2, wherein the temperature sensor means (26) are assigned to compressor control electronics (30) for controlling operation of the refrigerator compressor.

4. The device according to claim 3, wherein the motor electronics have means for voltage conversion (38) of an applied supply network AC voltage into an intermediate DC voltage factor correction, the intermediate DC voltage being wired for generating the DC operating voltage for the fan motor.

5. The device according to claim 1 further comprising speed-detection or monitoring means (32) which are assigned to the fan motor (10) and which are configured, regarding a predetermined or predeterminable ratio or ratio range of the operating speed in relation to the operating or used cooling space temperature, to detect or display a malfunction in response to said ratio exceeding or falling short of a ratio threshold.

6. An ultra-low temperature refrigerator (20) having at least one refrigerator compressor (14) and the refrigerator fan device according to claim 1 assigned to the refrigerator compressor and to a cooling circuit heat exchanger (15) of the refrigerator, the ultra-low temperature refrigerator having a voltage supply unit (38) designed to be connected to a public power supply network and configured for a mains AC voltage between 85 V and 264 V, as a nominal mains AC voltage and providing an operating DC voltage for the refrigerator fan device.

7. The refrigerator according to claim 6, wherein the refrigerator fan device is designed and configured such that in a cooling mode of the refrigerator at a target cooling temperature of the used cooling space to be cooled, the operating speed of the fan motor is reduced as compared to a fan speed during cooling down of the used cooling space by the refrigerator compressor and has been or is reduced continuously or according to a preferred proportional control curve.

8. The device according to claim 1, wherein said fan motor (10) is connection to the refrigerator compressor or the refrigerator control electronics.

9. The device according to claim 4, wherein the motor electronics further comprise means for power factor correction.

10. The refrigerator according to claim 6, wherein the mains AC voltage is between 100 V and 230 V.

11. A refrigerator fan device, comprising:
a fan motor (10) which has a fan rotor (12), the fan motor being provided in an air duct along with a refrigerator heat exchanger (15) or a refrigerator compressor (14), the fan motor being positioned in the air duct between an air inlet (16) and an air outlet (18) of a refrigerator housing (20, 22),
said fan motor (10) being connected to a unit of the refrigerator, via electrical supply or control lines,
wherein the fan motor (10) is a brushless speed-controllable DC motor whose operating speed is controlled as a function of an operating or used cooling space temperature signal of the assigned refrigerator compressor, wherein a DC operating voltage for the fan motor is generated by or derived from motor electronics (38) that are assigned to the refrigerator compressor, and
further comprising delay means which act on the assigned refrigerator compressor and which are configured such that in response to an activation signal which activates the refrigerator (20) or operation start signal which starts an operation of the refrigerator compressor (14), the fan motor is activated a predetermined time interval prior to activation of the refrigerator compressor.

12. The device according to claim 11, wherein the delay means are configured or designed such that the predetermined time interval is between 1 s and 360 s.

13. The device according to claim 12, wherein the predetermined time interval is between 2 s and 30 s.

14. The device according to claim 12, wherein the predetermined time interval is between 3 s and 10 s.

* * * * *